March 18, 1969  E. W. BOTTUM ET AL  3,432,910
METHOD OF APPLYING A NON-FERROUS CORROSION RESISTANT
COATING TO REFRIGERATION COMPONENTS
Filed Aug. 23, 1965

Inventors
EDWARD W. BOTTUM
FRANK H. ROCKWELL
By WILSON, SETTLE, BATCHELDER
ATT'YS. & CRAIG 3,432,910
METHOD OF APPLYING A NON-FERROUS CORROSION RESISTANT COATING TO REFRIGERATION COMPONENTS
Edward W. Bottum and Frank H. Rockwell, Brighton, Mich., assignors to Refrigeration Research, Incorporated, Brighton, Mich., a corporation of Michigan
Filed Aug. 23, 1965, Ser. No. 481,573
U.S. Cl. 29—458
Int. Cl. B23p 3/00; B23k 31/02
6 Claims

ABSTRACT OF THE DISCLOSURE

The method is particularly useful for applying a corrosion resistant coating to a refrigeration component such as a receiver or an accumulator. The component includes a casing fabricated from a ferrous metal. It has a tubular portion with end closures. The end closures form joints with the tubular portion. Fittings extend into the component and also form joints. These joints are placed to provide a fluid-tight component. The method includes the step of first applying a copper-containing brazing material around the joints as a relatively thick layer. The entire exterior surface of the component is then coated with a copper-containing material in finely divided form in a liquid carrier. The component is then dried to form a relatively thin layer of the brazing material in finely divided form over the entire surface thereof. The component is then subjected to heat in a brazing furnace preferably having an inert atmosphere. The heating is continued for a time sufficient to braze the joint and braze the relatively thin layer to form a continuous uniform coating over the entire exterior surface of the component. The surface of the component is preferably prepared by roughening or by uniformly oxidizing before application of the thin layer of brazing material. This step improves the adhesion of the layer.

---

Figures 1, 2:
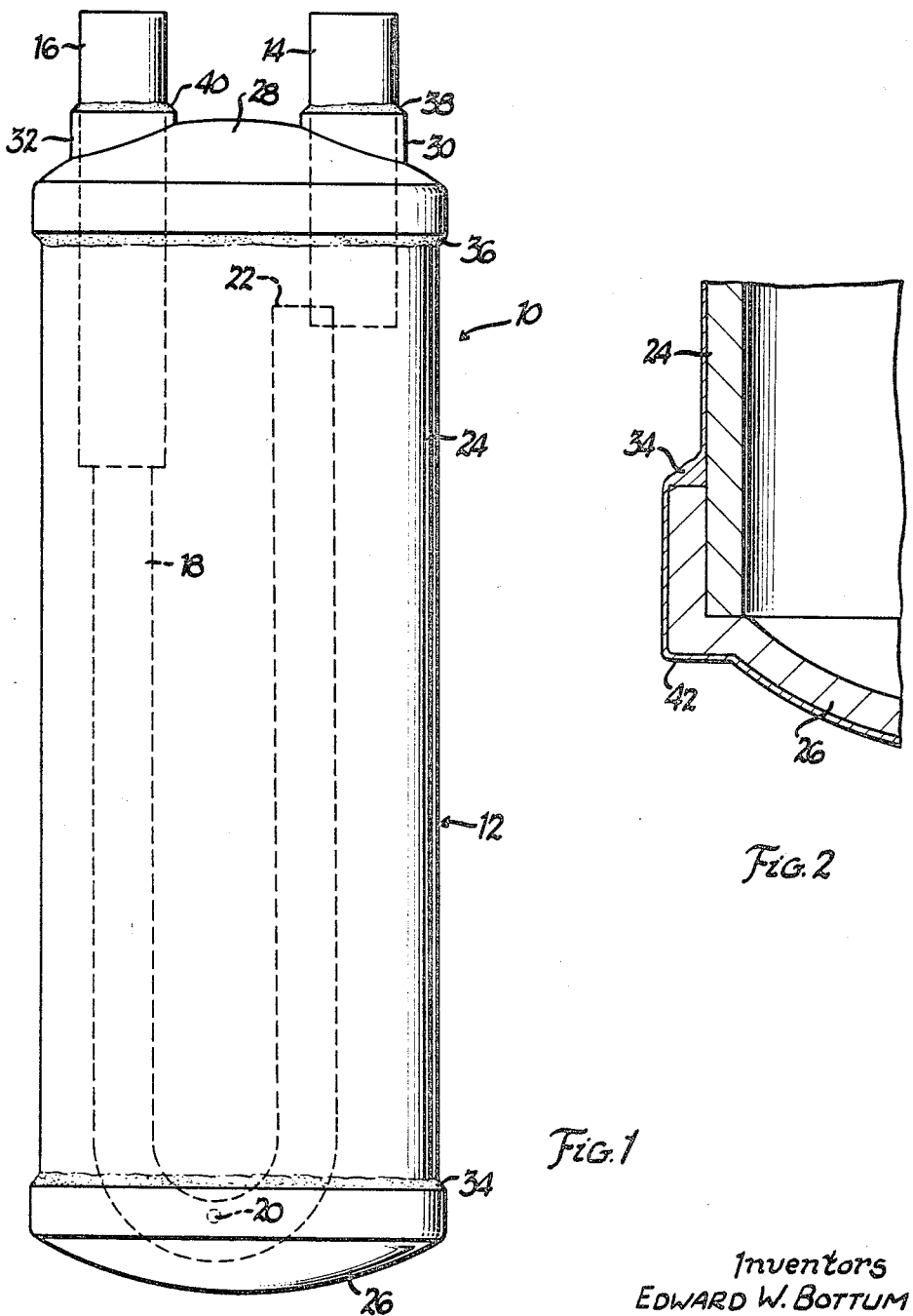

The present invention is concerned with refrigeration components which are fabricated of steel or other ferrous metals and which include joints which must be brazed to seal the unit. Examples of refrigeration components which may be so constructed are filter-driers, dehydrators, heat exchangers, strainers, receivers, receiver-driers, and accumulators, accumulator-driers and suction accumulators. Of particular interest to the present invention are accumulators and receivers, these components being almost always fabricated from steel.

In the environment of refrigeration apparatus, corrosion of a component is always a problem. In fact, several of the above-mentioned components are usually fabricated of copper or copper and brass in order to eliminate or minimize the corrosion problem. The present invention provides a simple and economical method for applying a corrosion-resistant coating onto such components at the same time that the joints thereof are brazed. A copper coating, in particular, is desirable because it not only acts to inhibit corrosion but also has the secondary benefit of providing a copper coating on nipples and parts which must be subsequently silver soldered or brazed. Copper is more readily brazed or silver soldered than steel and the coating thus permits ready soldering upon installation of the component in a refrigeration system.

It is, therefore, an object of the invention to provide a method for applying a non-ferrous corrosion-resistant coating to a refrigeration component simultaneously with brazing the joints of the component. A particular example would be the application of the copper coating in a hydrogen brazing process.

Another object of the invention is the provision of such a method which is particularly adaptable to the coating of receivers and accumulators, these components being normally fabricated from steel.

A further object of the invention is to provide such a method which is readily adaptable to conventional brazing equipment, such as a hydrogen copper brazing furnace.

Other objects of this invention will appear in the following description and appended claims, reference being had to the accompanying drawings forming a part of this specification wherein like reference characters designate corresponding parts in the several views.

In the drawing:

FIGURE 1 is an elevational view of a suction accumulator which has had a non-ferrous coating brazed thereon in accordance with the present invention, and FIGURE 2 is a sectional view of the lower left corner of the FIGURE 1 suction accumulator on an enlarged scale to illustrate the coating which has been brazed thereon.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, it will be noted that a suction accumulator has been illustratively shown as the typical type of a unit in connection with which the present invention is particularly suited. The suction accumulator 10 includes a fluid-tight casing 12 into which an inlet tube 14 extends, the inlet tube being adapted for connection to the evaporator of a refrigeration system. The inlet tube 14 terminates a short distance inside of the casing 12. An outlet tube 16 also extends into the casing 12 and is secured therein to a U-tube 18. The outlet tube 16 is adapted for connection to the compressor of the system. A small metering opening 20 is provided in the lower portion of the U-tube 18. In operation of the accumulator, cold refrigerant gas, having a small amount of entrained liquid refrigerant and oil therein, enters the casing 12 through the inlet tube 14. Refrigerant gas is drawn into the open end 22 of the U-tube 18 and is eventually drawn into the compressor. Oil and liquid refrigerant collects at the bottom of the casing 12. This liquid mixture is drawn through the metering opening 20 at a metered rate to thus prevent large amounts thereof from being suddenly injected into the compressor.

The casing 12 of the accumulator is fabricated from steel as may also be the tubes 14, 16, 18. The casing comprises a central tubular portion 24 having end closures 26 and 28. End closure 28 is provided with tubular projections 30, 32 to receive the inlet tube 14 and outlet tube 16.

It will be appreciated that in assembling the accumulator 10, it is necessary to have access to the interior of the casing in order to properly arrange the various components which are to be received within the casing. It is consequently necessary to have separate end closures 26, 28 in order to permit such access during manufacture of the unit. It will also be appreciated that the casing must be fluid-tight in order that it may be incorporated into a closed refrigeration system. Consequently, it is necessary to braze the joints at each end of the casing as indicated at 34 and 36 and also to braze the joints at the inlet tube 14 and projection 30 and outlet tube 16 and projection 32 as indicated at 38 and 40.

It will be appreciated that as a result of the passage of cold refrigerant gas through the accumulator 10, moisture will tend to condense on the exterior surface of the accumulator. The steel construction of the accumulator along with condensed moisture on the exterior thereof generally leads to a serious corrosion problem. Paints and other conventional finishes have not been entirely satisfactory as corrosion inhibitors in the past because they tend to degrade after extended periods of use.

In accordance with the present invention, a continuous metal coating of a non-ferrous, corrosion inhibiting metal is applied to the entire exterior surface of the accumulator. This may be done at the same time that the joints thereof are brazed, the coating being brazed to the accumulator surface along with the brazing of the joints.

Brazing is, of course, a well known process for uniting two metallic parts with an alloy metal through the medium of surface cohesion between the base metal and the alloy. In brazing, the brazing metal has a lower melting point than the base metal, and the uniting of the metals is a surface cohesion between the molecules to a limited depth below the surface of the base metal.

Brazing is particularly adopted for ferrous parts. In accordance with the present invention, the brazing material is preferably a copper or copper alloy, such as brass, bronze or a copper-zinc mixture. However, other brazing materials which are suitable for ferrous bases and which will result in corrosion inhibiting may be used, for example, such as a nickel-chrome alloy.

The brazing in accordance with the present invention is accomplished by furnace brazing. Furnace brazing employs the heat of a gas-fired, electrical, or other type of furnace to raise the parts to brazing temperature. Fluxes may be used, although reducing or inert atmospheres are more common because they eliminate post brazed cleaning necessary with fluxes. Preferably, the brazing, in accordance with the present invention, is accomplished with a hydrogen atmosphere.

In preparation for brazing, the unit is first assembled together in its final form. Brazing material is applied around the joints in a relatively thick layer to eventually form the brazed joints as indicated at 34, 36, 38, 40. This brazing material may be applied in the form of rings, paste, slugs or any other conventional means.

The surface of the casing is preferably then prepared for receiving the thin metal coating. Preparation of the surface involves roughening the surface in a uniform manner. When the surface is roughened, the thin metal coating will not run during the brazing process. If the surface is not roughened, the final metal coating tends to be very thin or nonexistent in some areas and thicker than desired in other areas. One method of roughening the surface is by sand blasting. Another method is to pickle the components in an acid bath sufficiently to cause uniform etching over the surface. The preferred way of roughening the surface appears to be to cause formation of an oxide uniformly over the surface. Formation of an oxide may be by means of permitting the unit to rust by exposure to a humid atmosphere resulting in a ferrous oxide on the entire surface. The preferred method of obtaining a uniform oxide on the surface is to heat the component in the presence of oxygen at a controlled temperature for a predetermined length of time. When the oxide method of roughening the surface is used, the component should be subsequently brazed in a reducing furnace so that the oxide will be reduced back to the original steel. The finished coating has excellent properties and appears to become an integral part of the outer surface of the component with use of the oxide method.

After the surface has been roughened, a relatively thin coating of the brazing material in finely divided form is applied over the entire surface. The coating may be applied by spraying a coating of powdered material, usually in a liquid carrier, onto the surface of the casing. The coating may also be applied by dipping or any other suitable application techniques. When the surface of the component is roughened by etching, the coating may conveniently be applied by electro-plating techniques.

After the coating has been applied, the entire assembly is passed through a furnace. When the assembly emerges, all of the joints are brazed and a uniform, continuous coating remains on the entire surface of the unit as indicated at 42 in FIGURE 2.

It should be appreciated that the thin coating may be applied after the joints of the component have been brazed. Additionally, the thin coating may be applied to a component in which the joints are arc welded or assembled by welding techniques rather than hydrogen brazing. Further, it is not necessary to coat the entire unit. In some instances, it may be desired to coat only a portion of the component, such as a nipple or fitting. For example, it may be desirable to coat only the threads of a fitting of the component so that the threads will form a better connection and will not rust.

Having thus described our invention, we claim:

1. A method of applying a non-ferrous corrosion resistant coating to a refrigeration component comprising a casing fabricated from a ferrous metal and having joints which are brazed to provide a fluid-tight component, comprising the steps of applying a brazing material around the joints as a relatively thick layer, coating the entire exterior surface of the component with a relatively thin layer of the brazing material in finely divided form, then subjecting the component to heat in a brazing furnace for a time sufficient to braze the joints and braze the relatively thin layer to form a continuous, uniform coating over the entire exterior surface of the component.

2. A method of applying a copper containing corrosion resistant coating to a refrigeration component comprising a casing fabricated from a ferrous metal and having joints which are brazed to provide a fluid-tight component, comprising the steps of applying a copper-containing brazing material around the joints as a relatively thick layer, coating the entire exterior surface of the component with a relatively thin layer of the copper-containing brazing material in finely divided form, then subjecting the component to heat in a brazing furnace for a time sufficient to braze the joints and braze the relatively thin layer to form a continuous, uniform coating over the entire exterior surface of the component.

3. A method of applying a non-ferrous corrosion resistant coating to a refrigeration component comprising one of a receiver and accumulator, the component comprising a casing fabricated from a ferrous metal and including a tubular portion having end closures thereon forming joints therewith and fittings extended thereinto forming joints therewith which are brazed to provide a fluid-tight component, comprising the steps of applying a brazing material around the end closure joints and around the fitting joints as a relatively thick layer, coating the entire exterior surface of the component with a relatively thin layer of the brazing material in finely divided form, then subjecting the component to heat in a brazing furnace having an inert atmosphere for a time sufficient to braze the joints and braze the relatively thin layer to form a continuous, uniform coating over the entire exterior surface of the component.

4. A method of applying a copper-containing corrosion resistant coating to a refrigeration component comprising a casing fabricated from a ferrous material and having joints which are brazed to provide a fluid-tight component comprising the steps of applying a copper-containing brazing material around the joints as a relatively thick layer, coating the entire exterior surface of the component with a copper-containing material in finely divided form in a liquid carrier, drying the component to form a relatively thin layer of the brazing material in finely divided form, then subjecting the component to heat in a brazing furnace for a time sufficient to braze the joints and braze the relatively thin layer to form a continuous, uniform coating over the entire exterior surface of the component.

5. A method of applying a copper-containing corrosion resistant coating to a refrigeration component comprising one of a receiver and accumulator, the component comprising a casing fabricated from a ferrous metal and including a tubular portion having end closures thereon forming joints therewith and fittings extending thereinto forming joints therewith which are brazed to provide a fluid-tight component, comprising the steps of applying a copper-containing brazing material around the joints as a relatively thick layer, coating the entire exterior surface of the component with a copper-containing material in finely divided form in a liquid carrier, drying the component to form a relatively thin layer of the brazing material in finely divided form, then subjecting the component to heat in a brazing furnace having an inert atmosphere for a time sufficient to braze the joints and braze the relatively thin layer to form a continuous, uniform coating over the entire exterior surface of the compnent.

6. A method of applying a non-ferrous corrosion resistant coating to a ferrous metal substrate comprising the steps of uniformly oxidizing the surface of the ferrous substrate, coating the thus oxidized surface with a relatively thin layer of brazing material, then subjecting the thus coated ferrous substrate to heat in a brazing furnace with a reducing atmosphere for a time sufficient to braze the relatively thin layer to form a continuous uniform coating over the surface of the substrate and reduce the oxidized portion of the substrate back to the original ferrous metal.

References Cited

UNITED STATES PATENTS

| | | | |
|---|---|---|---|
| 1,755,416 | 4/1930 | Wachowitz | 29—500 X |
| 2,202,403 | 5/1940 | Sandberg | 29—500 X |
| 2,255,301 | 9/1941 | Thompson | 29—500 X |
| 2,373,921 | 4/1945 | Snell. | |
| 2,787,827 | 4/1957 | Karmazin | 29—527 X |
| 2,957,237 | 10/1960 | Regle | 29—500 X |
| 3,107,421 | 10/1963 | Turnbull | 29—458 X |

JOHN F. CAMPBELL, *Primary Examiner.*

J. L. CLINE, *Assistant Examiner.*

29—471.1, 500, 501, 502, 527

U.S. Cl. X.R.